United States Patent
Kalia et al.

(10) Patent No.: US 8,239,250 B2
(45) Date of Patent: Aug. 7, 2012

(54) INDUSTRY SIZE OF WALLET

(75) Inventors: Prashant Kalia, Fair Lawn, NJ (US); Karlyn Heiner Crotty, Pennington, NJ (US); Iwao Fusillo, Merrick, NY (US)

(73) Assignee: American Express Travel Related Services Company, Inc., New York, NY (US)

(*) Notice: Subject to any disclaimer, the term of this patent is extended or adjusted under 35 U.S.C. 154(b) by 996 days.

(21) Appl. No.: 11/608,179

(22) Filed: Dec. 7, 2006

(65) Prior Publication Data
US 2008/0133322 A1 Jun. 5, 2008

Related U.S. Application Data

(60) Provisional application No. 60/868,229, filed on Dec. 1, 2006.

(51) Int. Cl.
*G06Q 30/00* (2006.01)
(52) U.S. Cl. ........ 705/10; 705/14; 705/35; 705/36
(58) Field of Classification Search ........ 705/10, 705/14, 35, 36
See application file for complete search history.

(56) References Cited

U.S. PATENT DOCUMENTS

| | | | |
|---|---|---|---|
| 5,712,985 A | 1/1998 | Lee et al. | |
| 5,819,226 A | 10/1998 | Gopinathan | |
| 6,249,770 B1 | 6/2001 | Erwin et al. | |
| 6,405,181 B2 | 6/2002 | Lent et al. | |
| 6,430,539 B1 * | 8/2002 | Lazarus et al. | 705/10 |
| 7,191,150 B1 | 3/2007 | Shao et al. | |
| 7,249,076 B1 | 7/2007 | Pendleton et al. | |
| 7,376,618 B1 | 5/2008 | Anderson et al. | |
| 7,426,488 B1 | 9/2008 | Gompers et al. | |
| 7,624,070 B2 | 11/2009 | Lebouitz | |
| 7,657,471 B1 | 2/2010 | Sankaran et al. | |
| 7,753,259 B1 | 7/2010 | Taylor et al. | |
| 2002/0049626 A1 * | 4/2002 | Mathias et al. | 705/10 |

(Continued)

FOREIGN PATENT DOCUMENTS

JP 2001282957 10/2001

(Continued)

OTHER PUBLICATIONS

Chen, Yuxin et al., "Modeling Credit Card 'Share of Wallet': Solving the Incomplete Information Problem," New York University: Kaufman Management Center, http://www.gsb.stanford.edu/facseminars/events/marketing/pdfs/F2004_10-27_Chen.pdf, Oct. 27, 2004, 48 pages.

(Continued)

*Primary Examiner* — Nga B. Nguyen
(74) *Attorney, Agent, or Firm* — Snell & Wilmer L.L.P.

(57) ABSTRACT

Consumer spend by industry is modeled based on the industry sizes of wallet of consumers having a high share of wallet with a financial institution. A size of wallet is calculated for each consumer in a plurality of consumers. A share of wallet for each consumer is also calculated. A subset of the plurality of consumers whose share of wallet is above a given percentage of their size of wallet is then determined. For each consumer in the subset, an industry size of wallet is determined. A correlation between the industry size of wallet of a given consumer and one or more characteristics of the given consumer is then derived using the industry size of wallet for the consumers in the subset.

18 Claims, 12 Drawing Sheets

U.S. PATENT DOCUMENTS

| | | | |
|---|---|---|---|
| 2003/0009368 A1* | 1/2003 | Kitts | 705/10 |
| 2003/0130884 A1 | 7/2003 | Michaluk | |
| 2004/0088221 A1* | 5/2004 | Katz et al. | 705/14 |
| 2004/0107161 A1 | 6/2004 | Tanaka et al. | |
| 2004/0162763 A1 | 8/2004 | Hoskin et al. | |
| 2005/0055275 A1* | 3/2005 | Newman et al. | 705/14 |
| 2005/0080698 A1 | 4/2005 | Perg et al. | |
| 2005/0171884 A1 | 8/2005 | Arnott | |
| 2006/0229943 A1* | 10/2006 | Mathias et al. | 705/14 |
| 2006/0253328 A1* | 11/2006 | Kohli et al. | 705/14 |
| 2006/0259364 A1 | 11/2006 | Strock et al. | |
| 2006/0265259 A1* | 11/2006 | Diana et al. | 705/7 |
| 2007/0016501 A1 | 1/2007 | Chatterji et al. | |
| 2007/0168267 A1* | 7/2007 | Zimmerman et al. | 705/35 |
| 2008/0033852 A1* | 2/2008 | Megdal et al. | 705/35 |

FOREIGN PATENT DOCUMENTS

| | | |
|---|---|---|
| JP | 2002163449 | 6/2002 |
| JP | 2003316950 | 11/2003 |
| WO | 0116896 | 3/2001 |
| WO | 0139090 | 5/2001 |
| WO | 0180053 | 10/2001 |

OTHER PUBLICATIONS

International Search Report for Int'l Appln. No. PCT/US06/30384, mailed Dec. 26, 2006, 10 pages.

Final Office Action for U.S. Appl. No. 12/833,708 dated Feb. 18, 2011.

Non-Final Office Action for U.S. Appl. No. 12/909,645 dated Mar. 3, 2011.

Final Office Action for U.S. Appl. No. 11/611,699 dated Mar. 17, 2011.

Notice of Allowance for U.S. Appl. No. 12/368,799 dated Mar. 22, 2011.

Non-Final Office Action for U.S. Appl. No. 12/904,732 dated Apr. 20, 2011.

Dataman Group web page from Aug. 22, 2001; http://web.archive.org/web/20010822113446/http://www.datamangroup.com/summarized_credit.asp (1 of 2) on Sep. 14, 2010 10:48:45 AM.

Wyatt, Craig, "Usage models just for merchants," Credit Card Management vol. 8, Iss. 6, Sep. 1995, pp. 1-4.

Fickenscher, Lisa, "Merchant American Express Seeks to Mine its Data on Cardholder Spending Patterns," American Banker, vol. 162, Issue 56, Mar. 24, 1997, pp. 1-2.

Examiner's Report No. 1, for Australian Application No. 2006285253, dated Jul. 27, 2009.

Examiner's Report No. 2, for Australian Application No. 2006285253, dated Aug. 11, 2010.

Examiner's Report No. 3, for Australian Application No. 2006285253, dated Oct. 28, 2010.

JP; Office Action dated Nov. 26, 2010 in Application No. 2008-525214.

Examiner's Report No. 5, for Australian Application No. 2006285253, dated Apr. 8, 2011.

MX; Office Action dated Jun. 17, 2011 in Application No. MX/a/2007/012294.

USPTO; Office Action dated Sep. 7, 2007 in U.S. Appl. No. 11/169,589.

USPTO; Office Action dated Jan. 8, 2008 in U.S. Appl. No. 11/169,769.

USPTO; Office Action dated Mar. 11, 2008 in U.S. Appl. No. 11/169,588.

USPTO; Office Action dated Mar. 17, 2008 in U.S. Appl. No. 11/169,779.

USPTO; Office Action dated Apr. 8, 2008 in U.S. Appl. No. 11/586,737.

USPTO; Office Action dated May 13, 2008 in U.S. Appl. No. 11/169,664.

USPTO; Office Action dated May 13, 2008 in U.S. Appl. No. 11/615,747.

USPTO; Office Action dated Jul. 9, 2008 in U.S. Appl. No. 11/169,778.

USPTO; Office Action dated Jul. 16, 2008 in U.S. Appl. No. 11/497,562.

USPTO; Office Action dated Jul. 21, 2008 in U.S. Appl. No. 11/497,563.

USPTO; Office Action dated Jul. 31, 2008 in U.S. Appl. No. 11/497,521.

USPTO; Office Action dated Aug. 6, 2008 in U.S. Appl. No. 11/586,728.

USPTO; Office Action dated Aug. 21, 2008 in U.S. Appl. No. 11/169,769.

USPTO; Office Action dated Sep. 5, 2008 in U.S. Appl. No. 11/497,529.

USPTO; Office Action dated Sep. 5, 2008 in U.S. Appl. No. 11/497,530.

USPTO; Final Office Action dated Oct. 3, 2008 in U.S. Appl. No. 11/169,588.

USPTO; Office Action dated Oct. 15, 2008 in U.S. Appl. No. 11/586,737.

USPTO; Final Office Action dated Nov. 24, 2008 in U.S. Appl. No. 11/169,664.

USPTO; Office Action dated Nov. 26, 2008 in U.S. Appl. No. 11/169,779.

USPTO; Office Action dated Dec. 3, 2008 in U.S. Appl. No. 11/615,747.

USPTO; Office Action Restriction dated Dec. 10, 2008 in U.S. Appl. No. 10/978,298.

USPTO; Notice of Allowance dated Jan. 5, 2009 in U.S. Appl. No. 11/169,589.

USPTO; Final Office Action dated Jan. 12, 2009 in U.S. Appl. No. 11/169,778.

USPTO; Final Office Action dated Feb. 18, 2009 in U.S. Appl. No. 11/586,728.

USPTO; Final Office Action dated Feb. 25, 2009 in U.S. Appl. No. 11/497,563.

USPTO; Final Office Action dated Mar. 18, 2009 in U.S. Appl. No. 11/497,529.

USPTO; Final Office Action dated Mar. 18, 2009 in U.S. Appl. No. 11/497,530.

USPTO; Final Office Action dated Apr. 2, 2009 in U.S. Appl. No. 11/586,737.

USPTO; Office Action dated Apr. 29, 2009 in U.S. Appl. No. 10/978,298.

USPTO; Office Action dated Apr. 29, 2009 in U.S. Appl. No. 11/497,527.

USPTO; Advisory Action dated May 11, 2009 in U.S. Appl. No. 11/586,728.

USPTO; Office Action dated May 12, 2009 in U.S. Appl. No. 11/169,664.

USPTO; Advisory Action dated Jun. 8, 2009 in U.S. Appl. No. 11/497,521.

USPTO; Notice of Allowance dated Jun. 16, 2009 in U.S. Appl. No. 11/169,589.

USPTO; Advisory Action dated Jun. 18, 2009 in U.S. Appl. No. 11/497,563.

USPTO; Final Office Action dated Aug. 14, 2009 in U.S. Appl. No. 11/615,747.

USPTO; Office Action dated Nov. 25, 2009 in U.S. Appl. No. 11/586,737.

USPTO; Advisory Action dated Feb. 23, 2010 in U.S. Appl. No. 11/169,664.

USPTO; Advisory Action dated Mar. 10, 2010 in U.S. Appl. No. 11/497,527.

USPTO; Advisory Action dated Mar. 11, 2010 in U.S. Appl. No. 10/978,298.

USPTO; Advisory Action dated Apr. 16, 2010 in U.S. Appl. No. 12/103,394.

USPTO; Advisory Action dated May 19, 2010 in U.S. Appl. No. 11/169,778.

USPTO; Advisory Action dated Nov. 10, 2010 in U.S. Appl. No. 11/586,737.

USPTO; Advisory Action dated Aug. 26, 2010 in U.S. Appl. No. 11/586,728.

USPTO; Advisory Action dated Sep. 2, 2010 in U.S. Appl. No. 11/497,563.
USPTO; Advisory Action dated Feb. 3, 2011 in U.S. Appl. No. 12/103,394.
Non-Final Office Action for U.S. Appl. No. 11/611,699 dated Jun. 23, 2011.
USPTO; Advisory Action dated Feb. 3, 2011 in U.S. Appl. No. 12/103,403.
USPTO; Advisory Action dated Jan. 6, 2011 in U.S. Appl. No. 11/608,179.
USPTO; Advisory Action dated Jul. 29, 2010 in U.S. Appl. No. 12/103,418.
USPTO; Advisory Action dated Feb. 23, 2011 in U.S. Appl. No. 12/368,799.
USPTO; Notice of Allowance dated Mar. 28, 2011 in U.S. Appl. No. 12/909,645.
Notice of Allowance for U.S. Appl. No. 12/833,708 dated May 19, 2011.
Final Office Action for U.S. Appl. No. 11/497,563 dated Jun. 3, 2011.
USPTO; Advisory Action dated Jun. 6, 2011 in U.S. Appl. No. 11/611,699.
USPTO; Advisory Action dated Feb. 1, 2011 in U.S. Appl. No. 11/497,527.
Examiner's Report No. 4, for Australian Application No. 2006285253, dated Jan. 27, 2011.
International Search Report for Int'l Appln. No. PCT/US06/30384 dated Nov. 22, 2006.
Written Opinion for PCT Appln. No. PCT/US06/30384 dated Nov. 22, 2006.
International Search Report for Int'l Appln. No. PCT/US06/25569 dated Jan. 24, 2007.
Written Opinion for PCT Appln. No. PCT/US06/25569 dated Jan. 24, 2007.
IPRP for PCT Appln. No. PCT/US06/30384 dated Oct. 22, 2007.
IPRP for PCT Appln. No. PCT/US06/25569 dated Jan. 9, 2008.
International Search Report for Int'l Appln. No. PCT/US07/25964 dated Feb. 17, 2008.
Written Opinion for PCT Appln. No. PCT/US07/25964 dated Feb. 17, 2008.
International Search Report for PCT Application No. PCT/US07/25574 dated Mar. 21, 2008.
Written Opinion for PCT Application No. PCT/US07/25574 dated Mar. 21, 2008.
IPRP for PCT Application No. PCT/US07/25574 dated Jun. 16, 2009.
IPRP for PCT Appln. No. PCT/US07/25964 dated Jun. 24, 2009.
"Balance Transfers Offer Opportunities, Risk Credit Management Report" Jan. 29, 1996, vol. 6, Issue 2, Phillips Business Information—Newsletter.
"Credit Trends," Experian Information Solutions, Inc., Aug. 2000.
Card Marketing; "Card companies tap credit bureaus for data streams (Experian (Orange, CAI hopes to develop data mining tools to track the 'emerging consumer', such as start-up business and immigrant populations)"; Feb. 1998; pp. 1 and 2.
American Banker; "Eyes on Credit Software to Predict Bankruptcies in Demand (Companies that help identify consumers at risk of declaring bankruptcy are doing a booming business; some 1,350,118 peoplse filed for bankruptcy in 1998, up 95% over 1990 levels)"; Mar. 4, 1999; pp. 1 and 2.
Wright, D.; "Comparative evaluation of electronic payment systems"; Feb. 2002; p. 1.

Taiwan: Plastic Money Frims Break New Ground; "Plastic money turns to enterprise market"; Apr. 7, 1995; p. 1.
Messmer, Ellen; Network World; "Firm taps B2B e-comm to boost customer service. (Company Business and Marketing"; Feb. 7, 2000; pp. 1 and 2.
American Banker; "Amex Offers Small-Firm Card With Built-in Spending Limits"; Jul. 31, 1995; p. 1.
Kim Namwoon; "Using Market Diffusion Models for Developing and Assessing Marketing Strategies (Technical Products)"; 1993; p. 1.
Bertrand Marotte; "powerful eye mines the depths of consumer spending: Bertrand Marotte explains how companies use information on your purchases to their advantage—and even your disadvantage.; [Final Edition]"; Jan. 14, 1998; pp. 1 and 2.
MX; Office Action dated Aug. 17, 2011 in Application No. MX/a/2008/001717.
Examiner's Report received Jan. 24, 2012 in Canadian Application No. 2,592,944.
USPTO; Office Action dated Feb. 4, 2011 in U.S. Appl. No. 12/144,506.
Office Action dated Mar. 3, 2011 in U.S. Appl. No. 12/180,256.
Final Office Action dated Aug. 5, 2011 in U.S. Appl. No. 12/144,506.
Final Office Action dated Aug. 10, 2011 in U.S. Appl. No. 12/180,256.
Advisory Action dated Aug. 18, 2011 in U.S. Appl. No. 11/497,563.
Final Office Action for U.S. Appl. No. 11/497,529 dated Sep. 1, 2011.
Non-Final Office Action for U.S. Appl. No. 11/497,530 dated Sep. 8, 2011.
Non-Final Office Action for U.S. Appl. No. 13/165,627 dated Sep. 22, 2011.
Advisory Action dated Sep. 30, 2011 in U.S. Appl. No. 12/144,506.
Notice of Allowance for U.S. Appl. No. 11/497,527 dated Oct. 5, 2011.
Notice of Allowance for U.S. Appl. No. 12/103,394 dated Oct. 5, 2011.
Notice of Allowance for U.S. Appl. No. 11/497,563 dated Oct. 6, 2011.
Notice of Allowance dated Oct. 12, 2011 in U.S. Appl. No. 12/904,732.
Notice of Allowance dated Oct. 18, 2011 in U.S. Appl. No. 11/497,527.
Notice of Allowance dated Oct. 18, 2011 in U.S. Appl. No. 12/103,403.
Supplemental notice of Allowability dated Oct. 19, 2011 in U.S. Appl. No. 12/103,394.
Supplemental notice of Allowability dated Oct. 19, 2011 in U.S. Appl. No. 11/497,563.
Advisory Action dated Oct. 27, 2011 in U.S. Appl. No. 12/180,256.
Advisory Action dated Nov. 10, 2011 in U.S. Appl. No. 11/497,529.
Notice of Allowance dated Nov. 10, 2011 in U.S. Appl. No. 13/165,627.
Office Action dated Nov. 15, 2011 in U.S. Appl. No. 13/209,035.
Final Office Action dated Dec. 8, 2011 in U.S. Appl. No. 11/611,699.
Office Action dated Dec. 14, 2011 in U.S. Appl. No. 13/274,029.
Office Action dated Dec. 14, 2011 in U.S. Appl. No. 13/274,046.
Notice of Allowance dated Dec. 28, 2011 in U.S. Appl. No. 13/274,029.
Notice of Allowance dated Dec. 28, 2011 in U.S. Appl. No. 13/274,046.
Notice of Allowance dated Feb. 29, 2012 in U.S. Appl. No. 11/611,699.

* cited by examiner

INDUSTRY SIZE OF WALLET

CROSS-REFERENCE TO RELATED APPLICATIONS

This application claims the benefit of U.S. Provisional Patent Application No. 60/868,229, filed Dec. 1, 2006, which is incorporated by reference herein in its entirety.

BACKGROUND OF THE INVENTION

1. Field of the Invention

The present application relates to financial data processing, in particular customer modeling and behavioral analysis.

2. Background Art

It is axiomatic that consumers will tend to spend more when they have greater purchasing power. The capability to accurately estimate a consumer's spend capacity could therefore allow a financial institution (such as a credit company, lender or any consumer services company) to better target potential prospects and identify any opportunities to increase consumer transaction volumes, without an undue increase in the risk of defaults. Consumers will be most attracted to products that are customized specifically for their individual interests and spending patterns. Attracting additional consumer spending in this manner, in turn, would increase such financial institution's revenues, primarily in the form of an increase in transaction fees and interest payments received. Consequently, a consumer model that can accurately estimate purchasing power and identify industries in which the consumer is most interested in spending is of paramount interest to many financial institutions and other consumer services companies.

A limited ability to estimate consumer spend behavior from point-in-time credit data has previously been available. A financial institution can, for example, simply monitor the balances of its own customers' accounts. When a credit balance is lowered, the financial institution could then assume that the corresponding consumer now has greater purchasing power. Such an assumption has its flaws, however. For example, it is oftentimes difficult to confirm whether the lowered balance is the result of a balance transfer to another account. Such balance transfers represent no increase in the consumer's capacity to spend, and so this simple model of consumer behavior has its flaws.

In order to achieve a complete picture of any consumer's purchasing ability and interests, one must examine in detail the full range of a consumer's financial accounts, including credit accounts, checking and savings accounts, investment portfolios, and the like. However, the vast majority of consumers do not maintain all such accounts with the same financial institution and the access to detailed financial information from other financial institutions is restricted by consumer privacy laws, disclosure policies and security concerns.

There is limited and incomplete consumer information from credit bureaus and the like at the aggregate and individual consumer levels. Since balance transfers are nearly impossible to consistently identify from the face of such records, this information has not previously been enough to obtain accurate estimates of a consumer's actual spending ability.

Accordingly, there is a need for a method and apparatus for determining a customer's size of wallet along with specific industries in which the customer is most likely to spend which addresses certain problems of existing technologies.

SUMMARY OF THE INVENTION

In one embodiment of the present invention, consumer spend by industry is modeled based on the industry sizes of wallet of consumers having a high share of wallet with a financial institution. A size of wallet is calculated for each consumer in a plurality of consumers. A share of wallet for each consumer is also calculated. A subset of the plurality of consumers whose share of wallet is above a given percentage of their size of wallet is then determined. For each consumer in the subset, an industry size of wallet is determined. A correlation between the industry size of wallet of a given consumer and one or more characteristics of the given consumer is then derived using the industry size of wallet for the consumers in the subset.

In another embodiment of the present invention, a customer can be targeted with an offer to increase the customer's industry share of wallet associated with a given financial institution. To do this, an industry size of wallet is estimated for one or more consumers. The external size of the industry size of wallet of each consumer is calculated, and one or more consumers having a relatively high external size of the industry wallet (that is, potential) and a reasonably high total share of wallet with the financial institution (that is, engagement with the financial institution) are targeted with offers to increase their industry share of wallet associated with the financial institution.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

I. Overview

Figure 1:
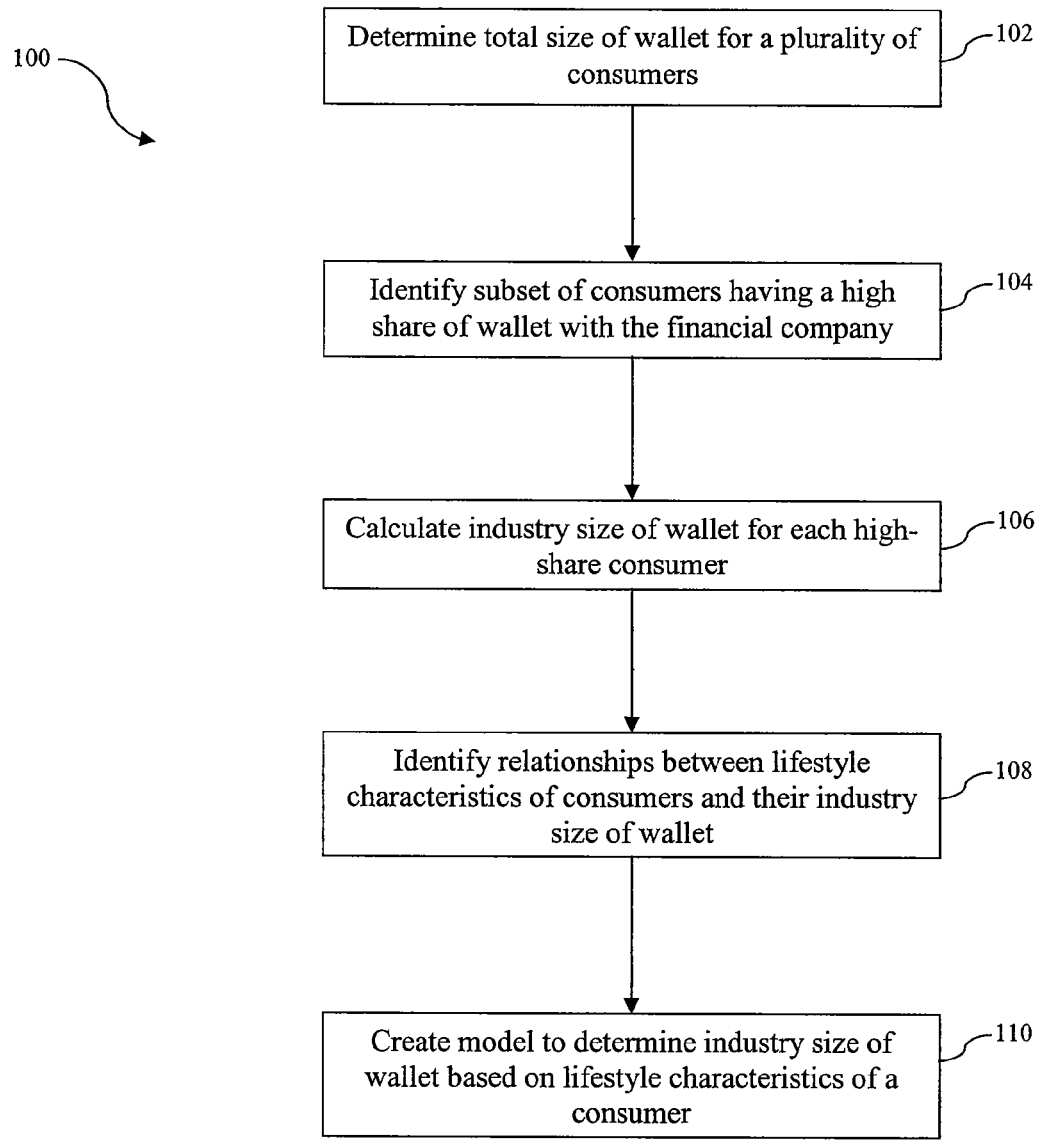
FIG. 1 is a flowchart of an exemplary process for creating an industry size of wallet model.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for determining a household size of wallet.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

A transaction account has a basic user, who is the primary user associated with the account. A transaction account may also have a supplemental user who is given access to the account by the basic user. The supplemental user may possess a duplicate of the transaction instrument associated with the account.

3. Account and Merchant Numbers

An "account," "account number" or "account code", as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card).

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

As used herein, the following terms shall have the following meanings. A trade or tradeline refers to a credit or charge vehicle issued to an individual customer by a credit grantor. Types of tradelines include, for example and without limitation, bank loans, credit card accounts, retail cards, personal lines of credit and car loans/leases. For purposes here, use of the term credit card shall be construed to include charge cards except as specifically noted. Tradeline data describes the customer's account status and activity, including, for example, names of companies where the customer has accounts, dates such accounts were opened, credit limits, types of accounts, balances over a period of time and summary payment histories. Tradeline data is generally available for the vast majority of actual consumers. Tradeline data, however, does not include individual transaction data, which is largely unavailable because of consumer privacy protections. Tradeline data may be used to determine both individual and aggregated consumer spending patterns, as described herein.

Consumer panel data measures consumer spending patterns from information that is provided by, typically, millions of participating consumer panelists. Such consumer panel data is available through various consumer research companies, such as comScore Networks, Inc. of Reston, Va. Consumer panel data may typically include individual consumer information such as credit risk scores, credit card application data, credit card purchase transaction data, credit card statement views, tradeline types, balances, credit limits, purchases, balance transfers, cash advances, payments made, finance charges, annual percentage rates and fees charged. Such individual information from consumer panel data, however, is limited to those consumers who have participated in the consumer panel, and so such detailed data may not be available for all consumers.

Although the present invention is described as relating to individual consumers, one of skill in the pertinent art(s) will recognize that it can also apply to small businesses and organizations without departing from the spirit and scope of the present invention.

II. Industry Size of Wallet

Consumers tend to spend more when they have greater purchasing power. It is thus advantageous for a financial institution (such as a credit company, lender or any consumer services company) to target existing customers and potential customers with opportunities to increase their transaction volumes. The capability to accurately estimate a consumer's spend capacity allows the financial institution to target potential prospects and identify any opportunities to increase consumer transaction volumes, without the financial institution experiencing an undue increase in the risk of defaults.

Additionally, consumers are most attracted to products that are customized specifically for their individual interests and spending patterns. Attracting additional consumer spending in this manner, in turn, increases the financial institution's revenues, primarily in the form of an increase in transaction fees and interest payments received.

A model may be developed that correlates spending patterns of consumers based on lifestyle characteristics of those consumers. Lifestyle characteristics may include, for example and without limitation, credit bureau tenure, age, gender, disposable income, geographic location, household size, number of transaction cards in a household, size of total spending wallet, and other third party data, as will be discussed in further detail below. Once lifestyle characteristics are identified as indicators of certain spending patterns, consumers can be categorized based on their lifestyle characteristics and the correlated spending patterns.

A. Model Development

A model for determining consumer spending patterns using various lifestyle characteristics may be developed based on detailed analysis of a number of consumers. Such a detailed analysis may include determining the total size of wallet of the customer, as well as ascertaining one or more lifestyle characteristics of the customer. FIG. 1 is an illustration of an exemplary method 100 for modeling consumer spending patterns using various lifestyle characteristics.

In step 102, the total size of wallet is determined for a plurality of consumers. The total size of wallet is the entire amount of spend by a particular consumer from tradeline data sources over a given period of time. The total size of wallet of a consumer may be calculated based on, for example and without limitation, internal customer tradeline data and/or external tradeline data available from, for example, a credit bureau. An exemplary method of calculating the size of wallet of an individual is described in U.S. patent application Ser. No. 11/169,588, filed Jun. 30, 2005, entitled Method and Apparatus for Consumer Interaction Based on Spend Capacity, incorporated by reference herein in its entirety.

Once the size of wallet has been calculated for a plurality of consumers, method 100 proceeds to step 104. In step 104, a subset of consumers having a high share of wallet with a particular financial institution is identified. The share of wallet is the portion of the spending wallet that is captured by the particular financial institution. Consumers having a high share of wallet with the particular financial institution may be those consumers whose spend on accounts associated with the financial institution is more than, for example, 90% of their total spend. This subset of consumers is used by the financial institution in modeling consumer behavior, because the financial institution typically has access to most of the individual records of charge of the consumers and can determine industry-related spending habits of the consumers. Consumers having an extremely high share of wallet with the financial institution (e.g., the top 1% of high-share consumers) may be excluded from the modeling process, to eliminate consideration of small business spending in the modeling process.

After determining the high-share subset of consumers, method 100 proceeds to step 106. In step 106, an industry size of wallet is calculated for each consumer. Information about the consumer's spending in various industries can be obtained in a variety of ways. As mentioned previously, since most of the spending of high-share consumers is done with the financial institution, the financial institution typically has a record of the consumer's spend by industry. If such a record does not already exist, the financial institution can, for example, analyze the records of charge of each consumer in the subset of consumers to determine the industry-related spending habits of each consumer. An industry is the type of good or service purchased by the consumer. Types of industries may include industries at a macro level, for example and without limitation, the travel industry, the restaurant industry, and the entertainment industry. Types of industries may also include industries at a micro level, for example and without limitation, the airline industry, the lodging industry, and the car rental industry, each of which is a subset of a macro industry, such as the travel industry. The industry-related spending habits of a consumer include, for example and without limitation, the amount of spend in a given industry and the rate of spend in the given industry. Although the present invention will mostly be described with respect to spend in the travel industry, one of skill in the relevant art(s) will recognize that the methods and systems disclosed herein may involve spend in any other industry without departing from the spirit and scope of the present invention.

Because the subset of consumers has a high share of wallet with the financial institution, it is reasonable to assume that the spending habits identified for each consumer using the records of the financial institution are reflective of the consumer's spending habits across his or her entire spending wallet. For example, if a person has a high share of wallet with the financial institution, that person's travel spending on accounts associated with the financial institution is likely approximately equal to his or her total travel spending. The amount of industry spend by each consumer in the high-share subset of consumers is deemed to be that consumer's industry size of wallet.

Once the industry size of wallet of each consumer in the subset of consumers has been determined, method 100 proceeds to step 108. In step 108, relationships between the characteristics and an industry size of wallet are identified. To identify these relationships, the spend habits of multiple consumers are examined to ascertain characteristics of the consumers that influence or are indicative of spend in a given industry. These characteristics include, for example and without limitation, financial and demographic characteristics, and are referred to herein as lifestyle characteristics. For example, if the financial institution wants to determine what factors influence travel spending, profiles of consumers who spend a high percentage of their wallet on travel can be compared to identify common lifestyle characteristics. In another example, profiles of consumers who spend a high percentage of their wallet on travel can be compared to profiles of consumers who spend a low percentage of their wallet on travel to identify differentiating lifestyle characteristics.

Figure 3:
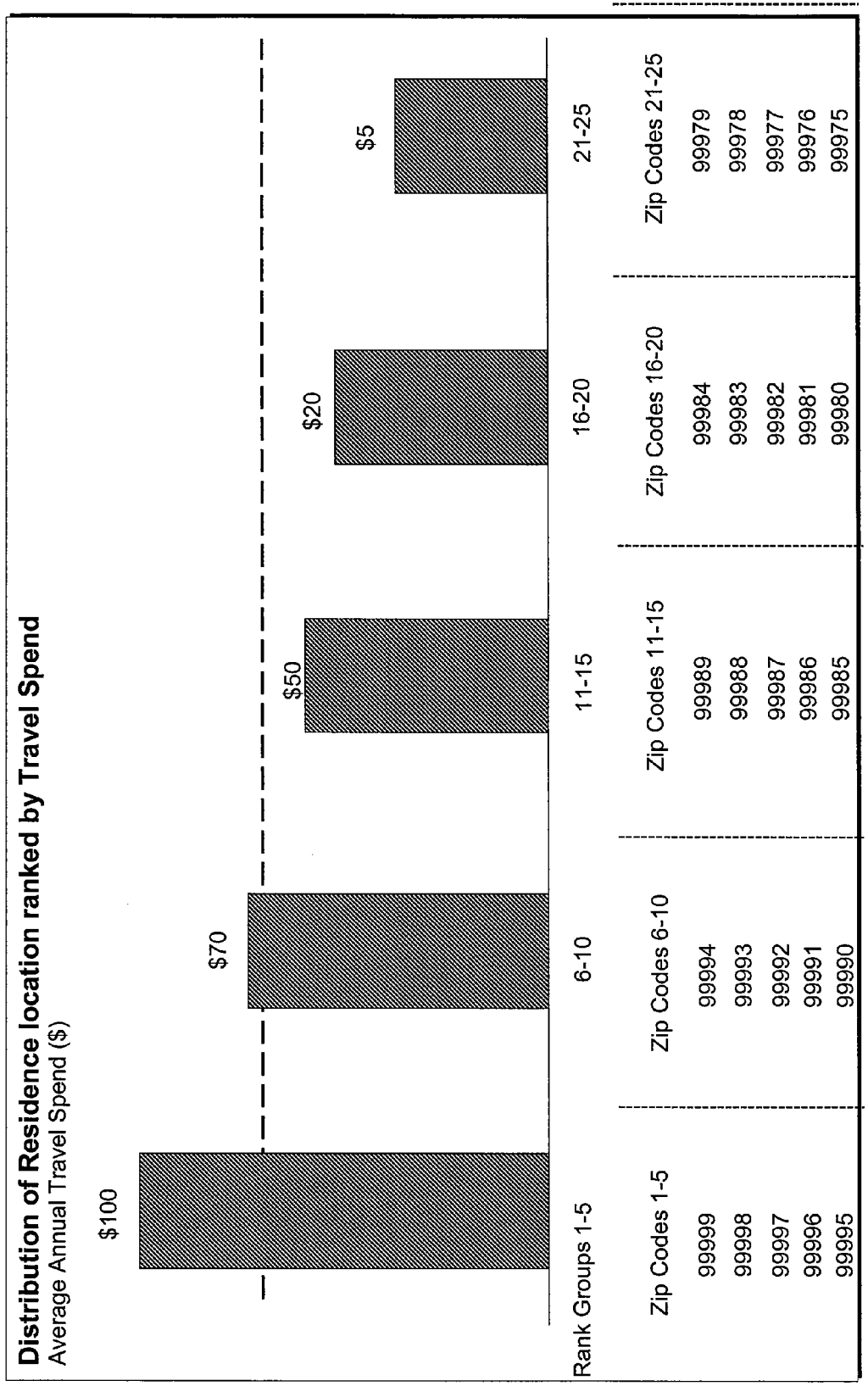
FIG. 3 is a graph of average travel size of wallet by residence location.

Some lifestyle characteristics may have a given weight (e.g., the magnitude of their effect on industry-related spend) regardless of the actual value of the characteristic. Other lifestyle characteristics may have a graded aspect to them, such that the weight of the variable is dependent on the value of the variable. An example lifestyle characteristic whose weight on airline spend varies based on the value of the characteristic is the geographic location of the consumer's residence. FIG. 3 is chart of residential zip codes versus average travel-related spend by residents of those zip codes. FIG. 3 takes into consideration the high-share subset of consumers, and computes, for example, an average airline spend value for each available zip code. As illustrated in FIG. 3, residents of zip codes closer to airports have more travel-related spend than residents of zip codes farther away from airports. A correlation thus exists between specific zip codes and the airline industry size of wallet, and the zip codes can be ranked based on their average airline spend. In this manner, the ranking becomes a variable indicative of airline spending.

Figure 4:
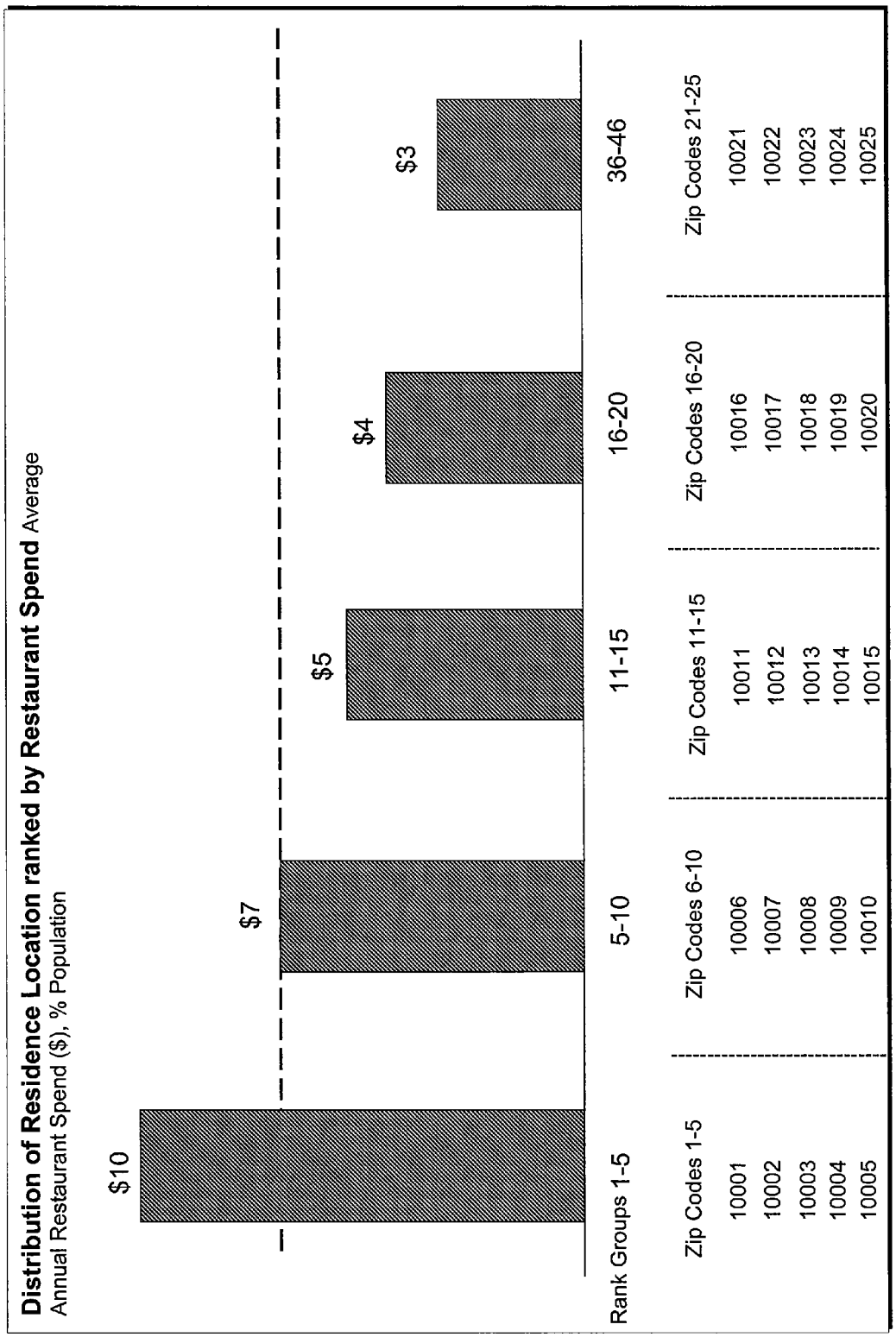
FIG. 4 is a graph of average restaurant size of wallet by residence location.

The geographic location of the consumer's residence can also influence restaurant spend, as illustrated in FIG. 4. FIG. 4 is a chart of residential zip codes versus average restaurant-related spend by residents of those zip codes. Correlations between specific zip codes and restaurant spending can thus be identified.

Figure 5:
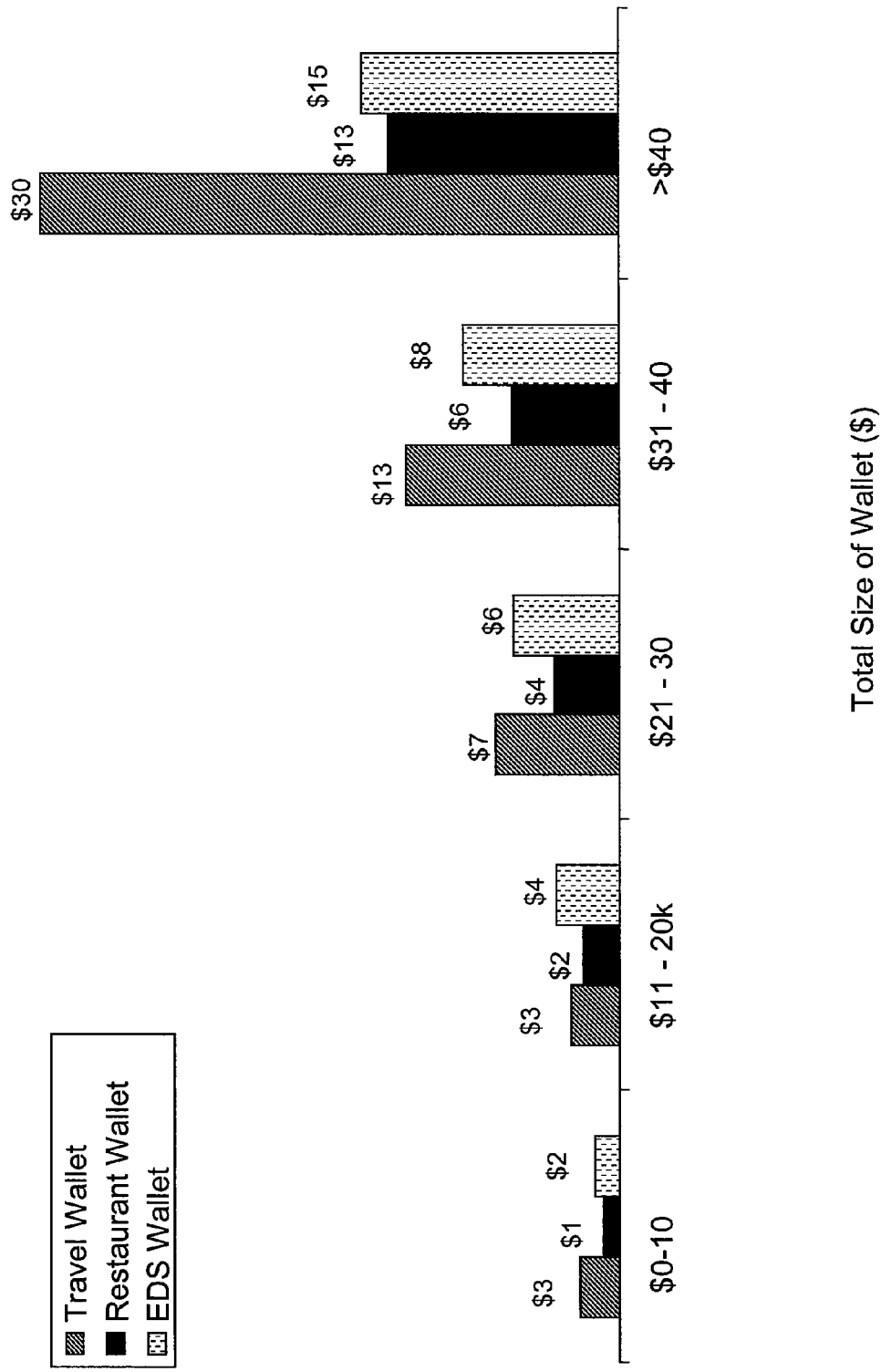
FIG. 5 is graph of average industry size of wallet relative to a consumer's total size of wallet.
Figure 6:
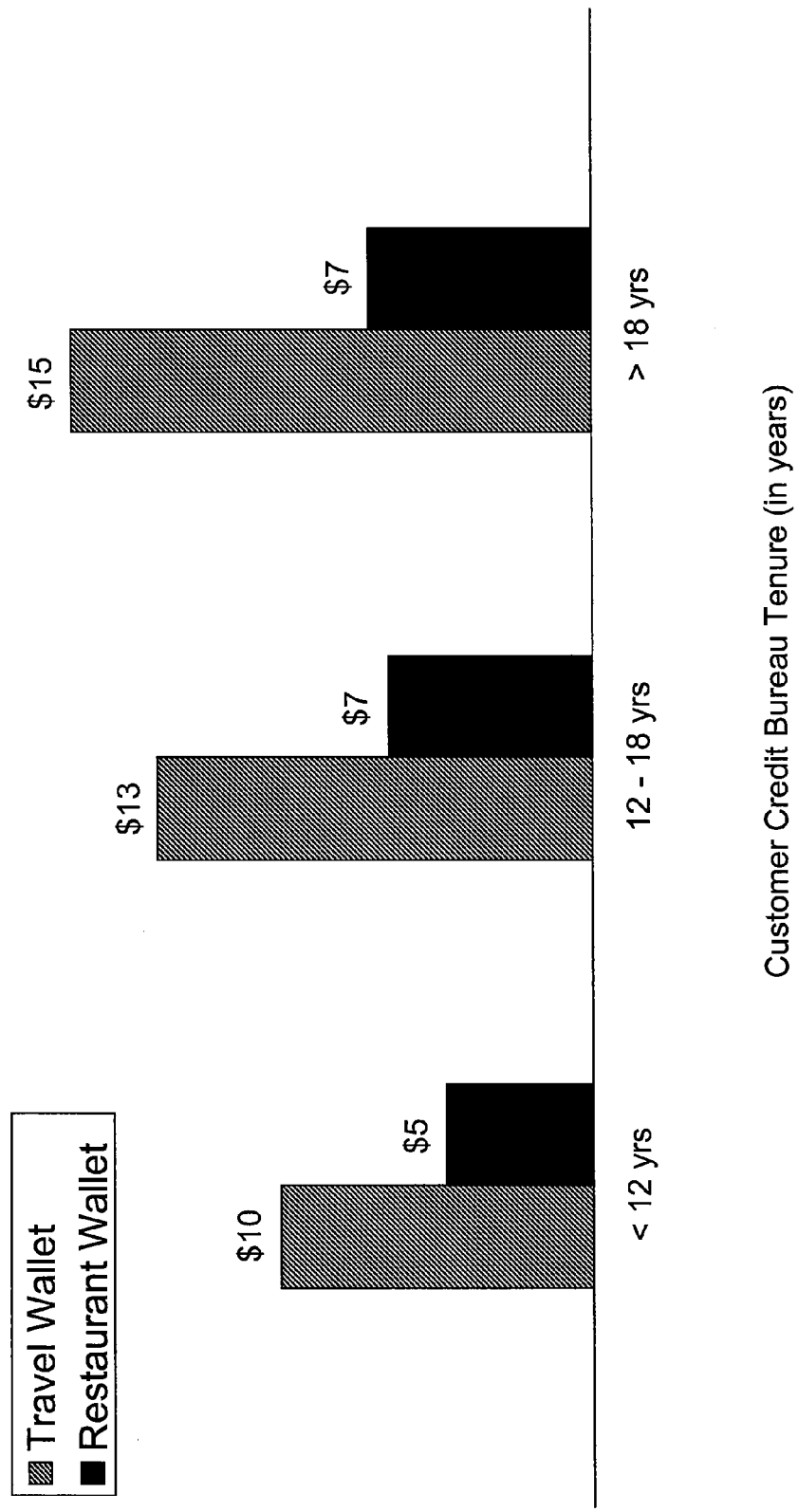
FIG. 6 is a graph of average industry size of wallet relative to a consumer's credit bureau tenure.
Figure 7:
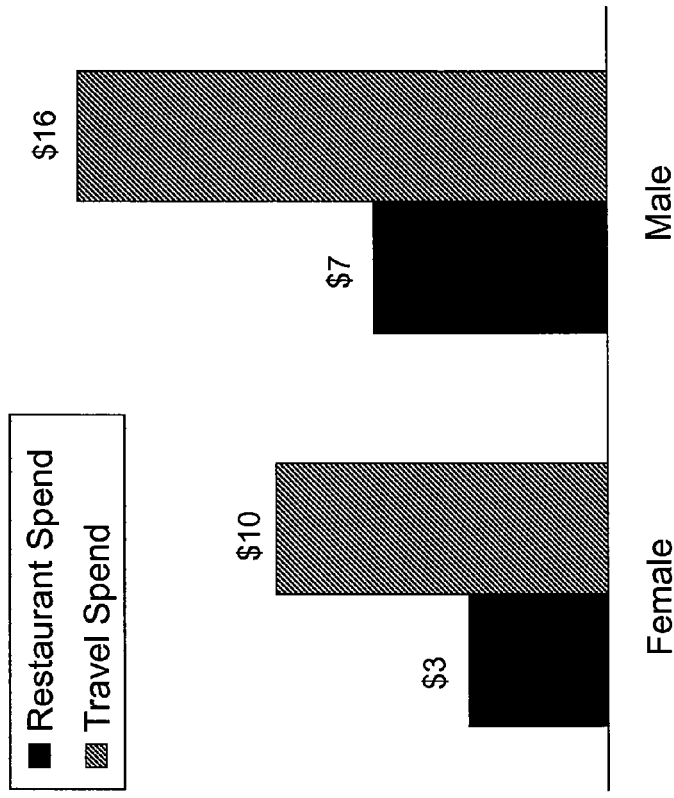
FIG. 7 is a graph of average industry size of wallet relative to a consumer's gender.
Figure 8:
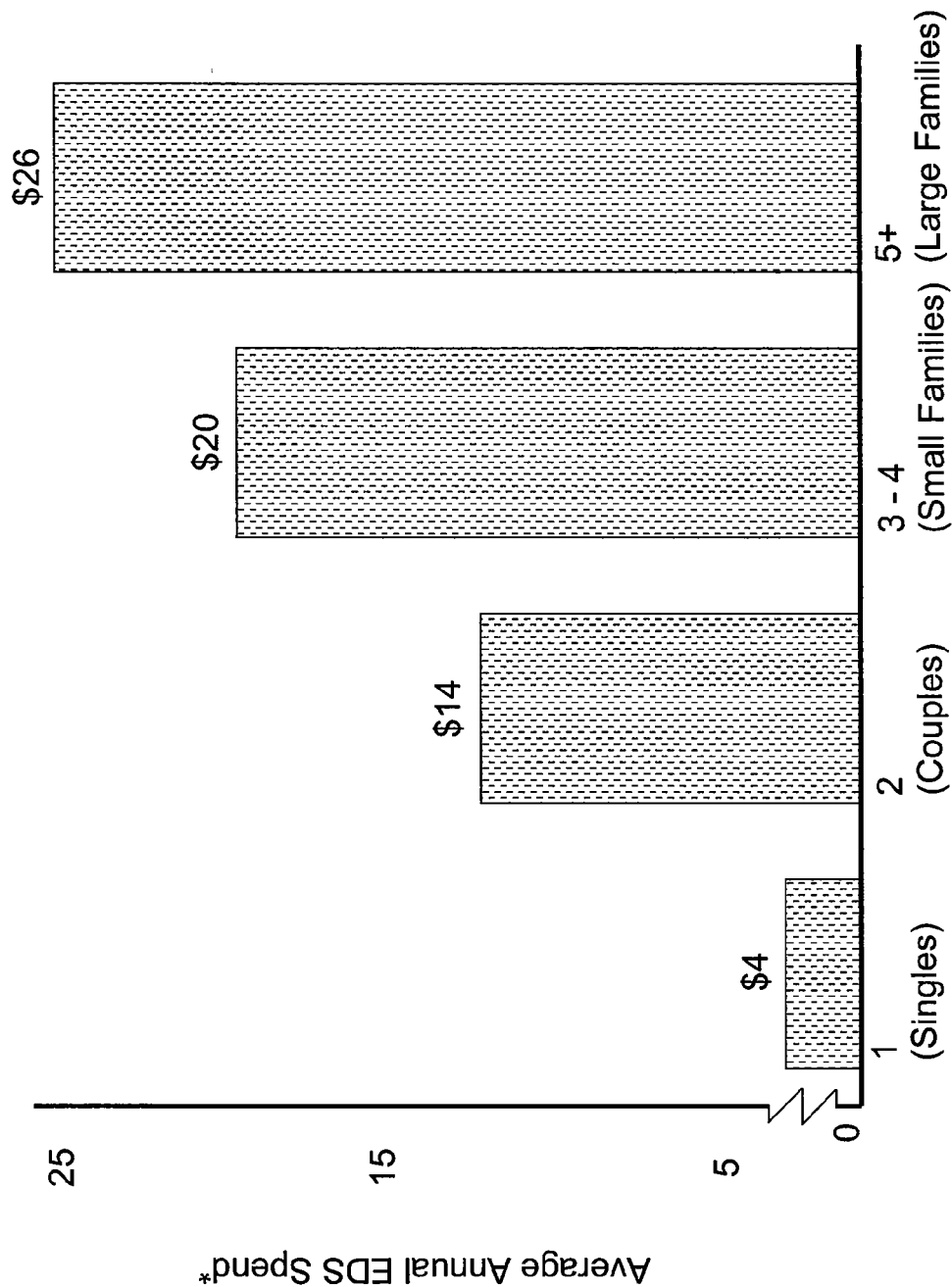
FIG. 8 is a graph of average everyday spend size of wallet by number of individuals in a household.
Figure 9:
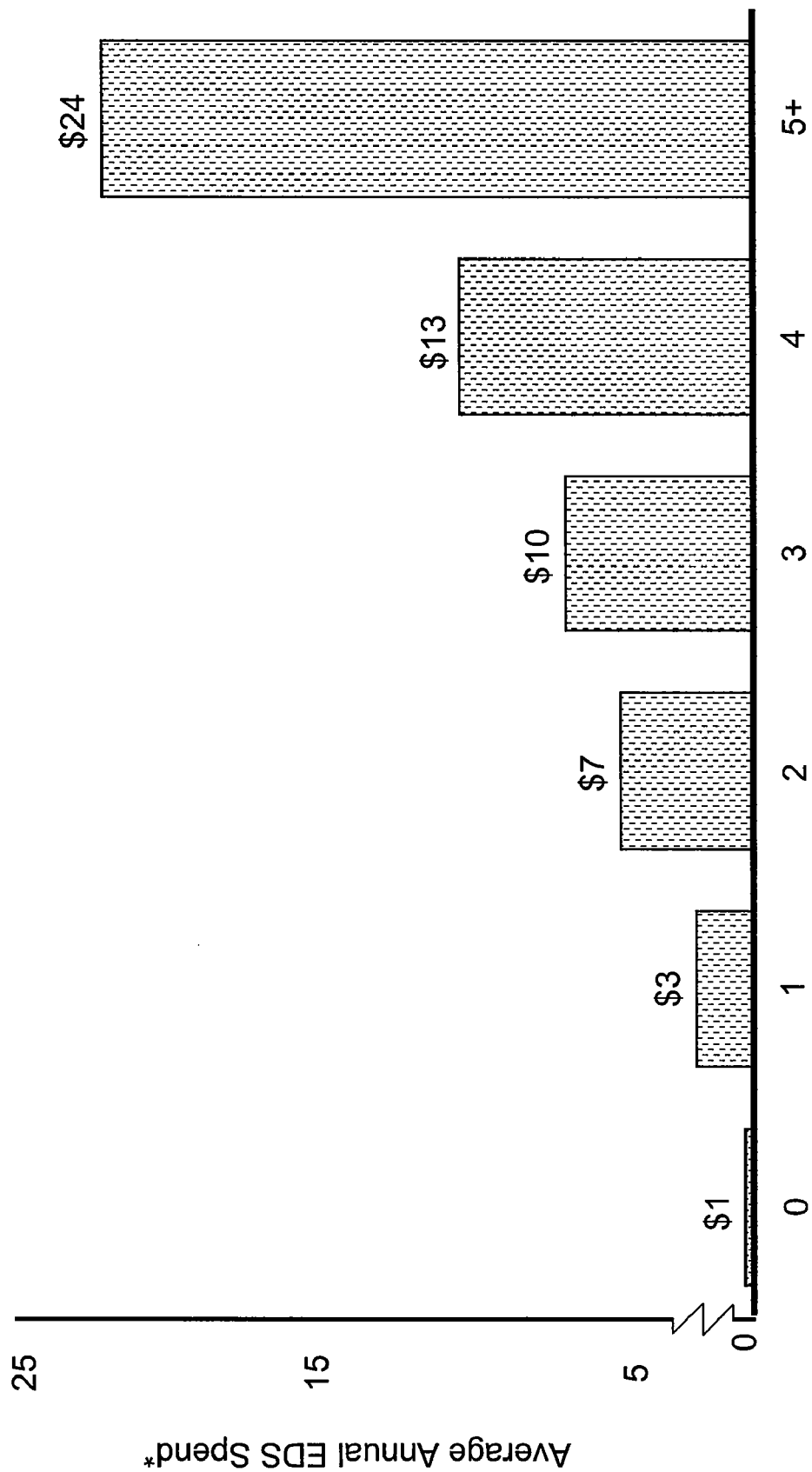
FIG. 9 is a graph of average everyday spend size of wallet by number of active transaction cards in a household.

Other lifestyle characteristics that influence spend in various industries may include, for example and without limitation, credit bureau tenure, age, gender, disposable income, geographic location, household size, number of transaction cards in a household, size of total spending wallet, and other third party data. FIG. 5 is a chart illustrating how the total size of a consumer's wallet is indicative of travel-related spend, restaurant-related spend, and everyday spend. As illustrated, travel-related spend has the strongest correlation with the total size of the consumer's wallet. FIG. 6 is a chart illustrating how credit bureau tenure is indicative of travel-related spend and restaurant-related spend. As illustrated, travel- and restaurant-related spend are significantly lower for consumers having low tenure with the bureau, and relatively higher for high tenure consumers. FIG. 7 is a chart illustrating how gender is indicative of travel-related spend and restaurant-related spend. As illustrated, travel- and restaurant-related spend is higher for males as compared to females. FIG. 8 is a chart illustrating the relationship between household size and everyday spend. As illustrated, everyday spend varies significantly with household size. Similarly, FIG. 9 is a chart illustrating the relationship between the number of active transaction cards in a household and everyday spend. As illustrated, everyday spend varies significantly with the number of active household cards.

After the lifestyle characteristics have been identified, method 100 proceeds to step 110, in which a model to determine industry size of wallet based on lifestyle characteristics of a consumer is created. In a first embodiment, the model simply identifies a typical industry size of wallet for consumers having certain lifestyle characteristics, based on the sizes of spending wallets of analyzed consumers sharing those lifestyle characteristics. In a second embodiment, a size of wallet algorithm is identified based on the correlations between consumers having common lifestyle characteristics.

Figure 10:
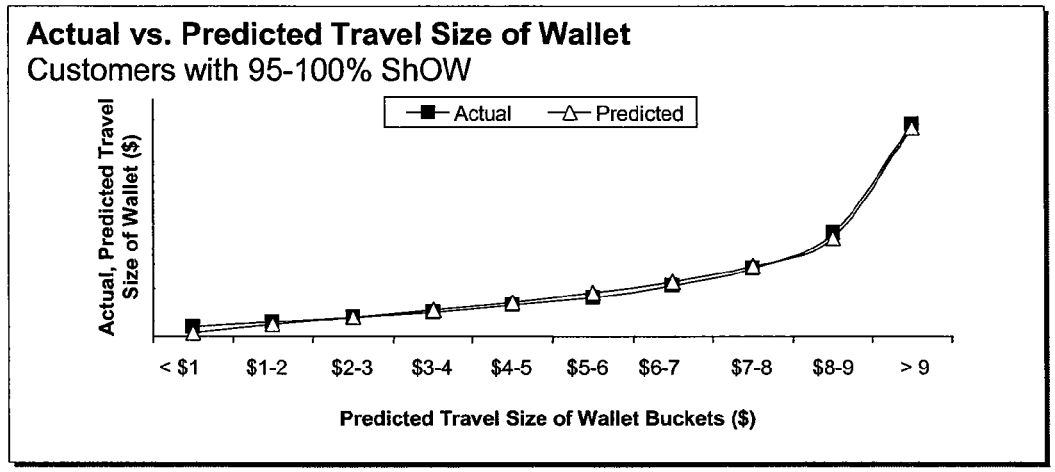
FIG. 10 is a graph illustrating the predictions of an exemplary size of travel wallet model against actual travel spend.
Figure 11:
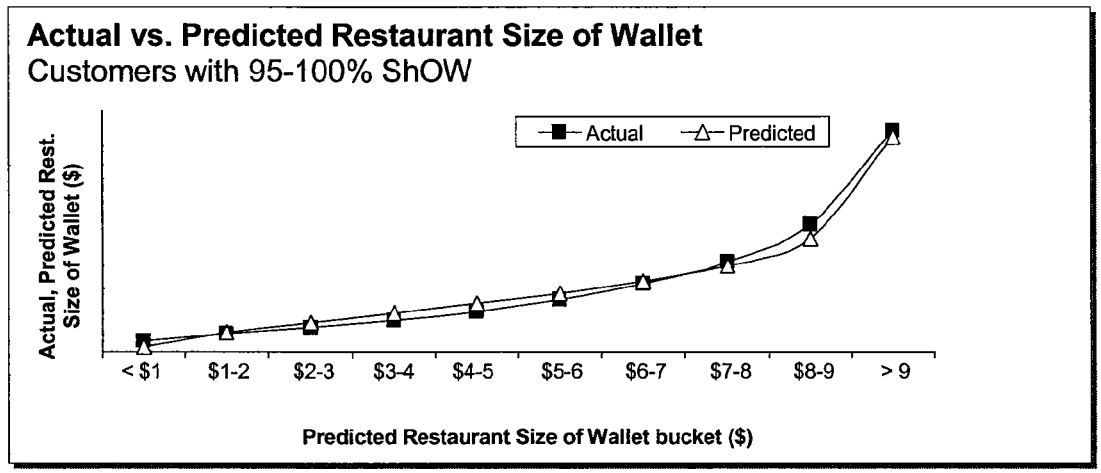
FIG. 11 is a graph illustrating the predictions of an exemplary size of restaurant wallet model against actual restaurant spend.

An example size of wallet algorithm for travel-related spend and restaurant related-spend is defined in Equation 1:

$$\text{Total Industry So } W = A + (B^*\text{Total Size of Plastic Spend Wallet}) + (C^*\text{Location Rank}) + (D^*\text{Customer Tenure on Bureau}) + (E^*\text{Customer Gender}),$$

where A, B, C, D, and E are correlation factors or weights corresponding to the importance of the associated lifestyle characteristics. A, B, C, D, and E may vary depending on whether the algorithm is used to determine, for example, travel size of wallet or restaurant size of wallet. FIG. 10 is a graph illustrating the travel size of wallet values predicted for various spend levels compared to the actual travel size of wallet values for the various spend levels. FIG. 11 is a graph illustrating the restaurant size of wallet predicted for various spend levels compared to the actual restaurant size of wallet values for the various spend levels. As illustrated, this model has a high level of prediction accuracy.

Figure 12:
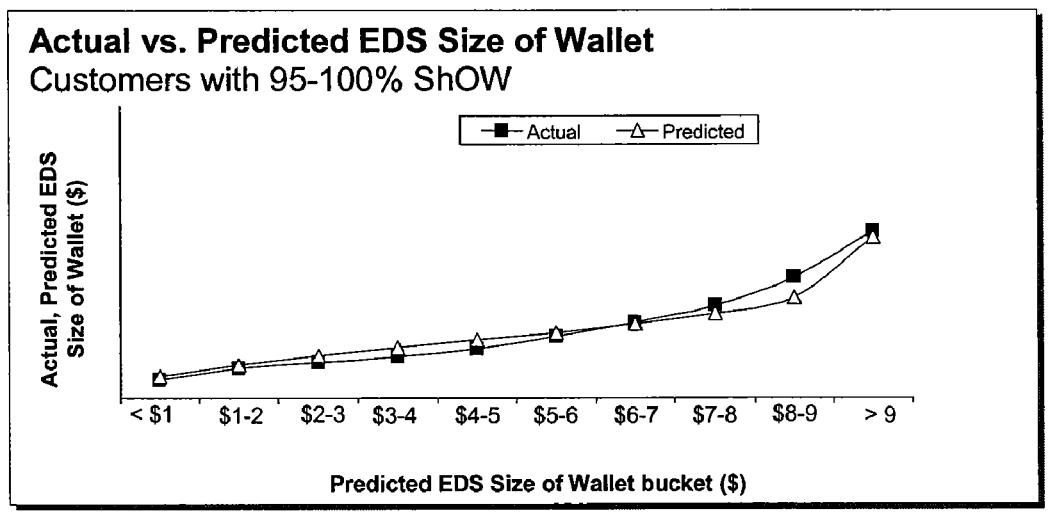
FIG. 12 is a graph illustrating the predictions of an exemplary size of everyday spend wallet model against actual everyday spend.

Similarly, an example everyday spend size of wallet algorithm is defined in Equation 2:

$$\text{Total EDS So } W = V + (W^*\text{Total Size of Plastic Spend Wallet}) + (X^*\text{Number of Active Household Cards}) + (Y^*\text{Location Rank}) + (Z^*\text{Household Size}),$$

where V, W, X, Y, and Z are correlation factors or weights corresponding to the importance of the associated lifestyle characteristics. FIG. 12 is a graph illustrating the everyday spend size of wallet values predicted for various spend levels compared to the actual everyday spend size of wallet values for the various spend levels.

Similar modeling approaches can also be used to incorporate interaction between industry spends into the industry size of wallet model. For example, spend in particular industries or at particular merchants may be indicative of spend in other industries or at other merchants.

B. Consumer Targeting

Figure 2:
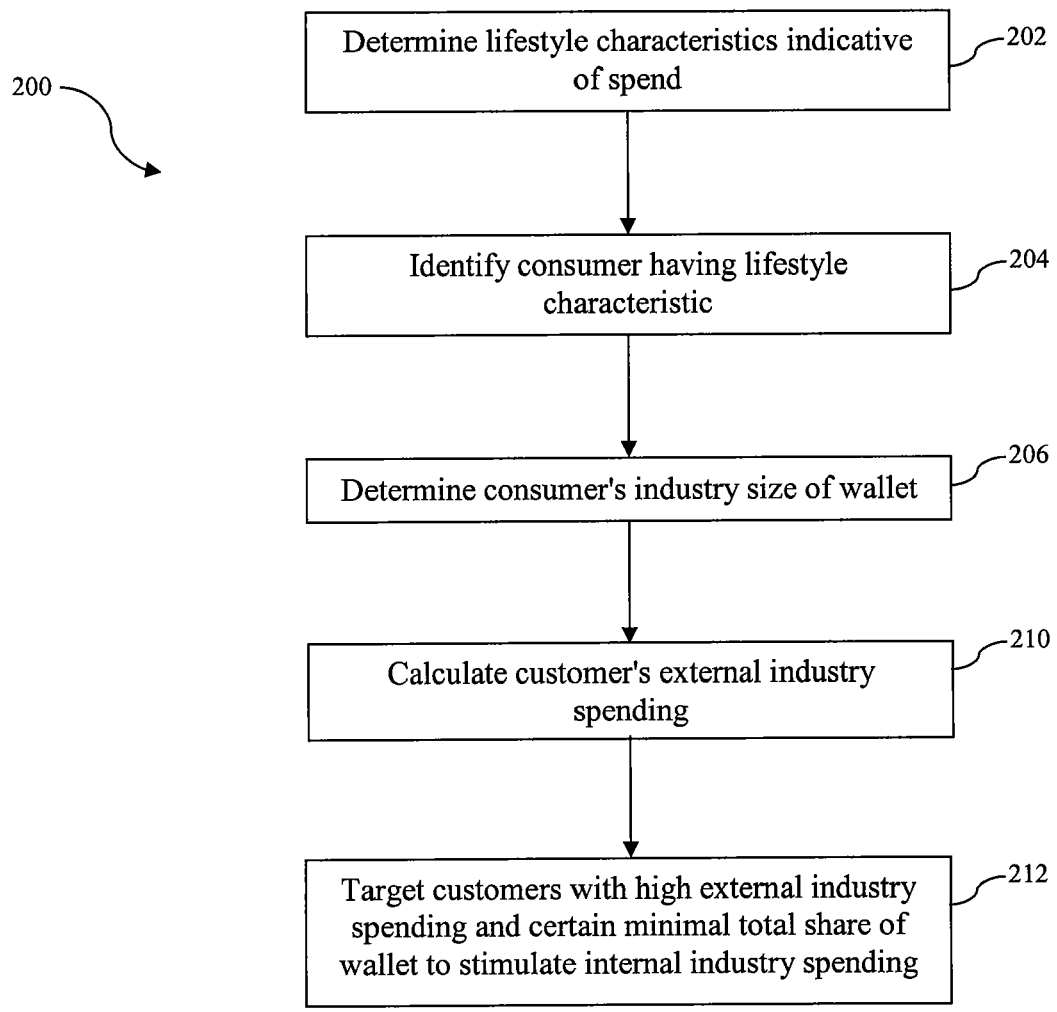
FIG. 2 is a flowchart of an exemplary process for targeting a consumer with an offer to increase spending.

Once a lifestyle characteristic indicative of spend in a particular industry has been identified, the financial institution can target consumers having that lifestyle characteristic with incentives to increase spend related to the industry, even if those consumers have low or medium share of wallet with the financial institution. FIG. 2 is an exemplary method 200 for targeting consumers with incentives to increase industry-related spend, according to an embodiment of the present invention.

In step 202, one or more lifestyle characteristics indicative of spend in a given industry are determined. These lifestyle characteristics may be determined in accordance with a method such as method 100 described above.

After step 202, method 100 proceeds to step 204. In step 204, a consumer having one or more of the determined lifestyle characteristics is identified. Since many lifestyle characteristics of a consumer are typically publicly available (such as, for example, from credit bureaus), the consumer does not need to have a high industry share of wallet with the financial institution in order to be identified by the financial institution. This method can thus be used to target an individual having a low or medium industry share of wallet with the financial institution. Since the identified consumer has a lifestyle characteristic in common with consumers who make purchases related to the given industry, the financial institution can assume, without specific knowledge of the identified consumer's industry-related spend, that the identified consumer also makes purchases related to the given industry and would be accepting of incentives to increase spend related to the given industry.

After identifying the consumer having one or more lifestyle characteristics indicative of spend in the given industry, method 200 proceeds to step 206. In step 206, the consumer is assigned an industry size of wallet based on the consumer's lifestyle characteristics. The industry size of wallet may be based on, for example, industry sizes of wallet calculated in step 110 (using, for example, Equation 1 or 2) of method 100 above.

The external size of wallet of the customer is calculated in step 210. The customer's external size of wallet may be calculated, for example, by subtracting the magnitude of the customer's industry spending associated with the financial institution from the magnitude of the customer's industry size of wallet. The remaining amount, which corresponds to spend in the industry that is not associated with the financial institution, is also referred to herein as the "external industry spend."

Method 200 then proceeds to step 212. In step 212, the identified consumer is targeted with an offer (or promotion) that will incent the consumer to increase spend related to the given industry. The offer may vary based on, for example, the external size of wallet calculated in step 210. If multiple consumers were identified in step 204, the consumers may be prioritized based on the external industry spend assigned in step 210, with consumers having a greater external industry spend taking priority over consumers having a smaller external industry spend.

Further, priority may be given to consumers having some minimal share of total wallet with the institution. A minimal share of total wallet will ensure a certain engagement level with the financial institution which would lead to improved responses to the spend offer. The customers can thus be optimized based on their total share of wallet and the amount of external industry spend, with the financial institution targeting only the most optimal consumers.

In a first embodiment, the offer may be an offer for a new product, which will encourage new spend related to the given industry. In the example of the airline industry, a consumer who has a lifestyle characteristic indicative of spend in the airline industry may be targeted, for example, with an offer for a credit card that is co-branded between the financial institution and an airline company. In a second embodiment, the offer may be an incentive to increase spending on an existing product held by the consumer. In the example of the airline industry, a consumer who has a lifestyle characteristic indicative of spend in the airline industry and who also has a financial account associated with a rewards program managed by the financial institution may be offered double reward points for spend on airline travel.

If a consumer qualifies for multiple spend offers or incentives, the financial institution may choose to target the consumer for the industry with the highest value of spend incentive. To do this, the consumer size and/or share of wallet is calculated for each industry (using, for example, Equations 1 and 2), and the industry having the largest size and/or share of the consumer's wallet determines the targeted industry.

III. Example Implementations

The present invention (i.e., process 100, process 200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 13:
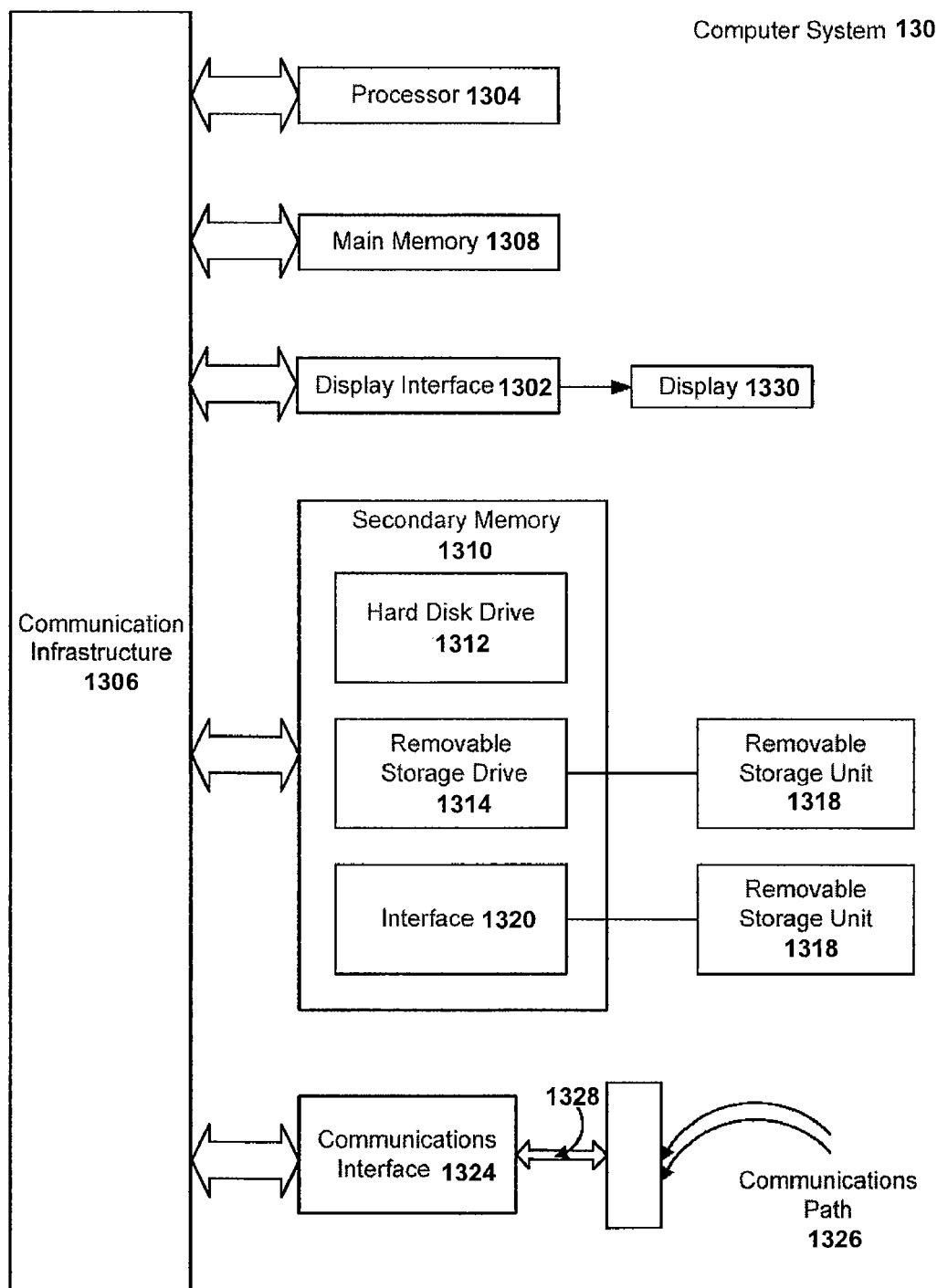
FIG. 13 is a block diagram of an exemplary computer system useful for implementing the present invention.

In fact, in one embodiment, the invention is directed toward one or more computer systems capable of carrying out the functionality described herein. An example of a computer system 1300 is shown in FIG. 13.

The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc. which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1318 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1318 and interfaces 1320, which allow software and data to be transferred from the removable storage unit 1318 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1314 and a hard disk installed in hard disk drive 1312. These computer program products provide software to computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

What is claimed is:

1. A method for modeling consumer spend by industry, comprising:

calculating, by a computer-based system for modeling consumer spend comprising a processor and a tangible, non-transitory memory, a size of wallet for each consumer in a plurality of consumers, wherein the size of wallet is calculated by a method comprising:

modeling, by the computer-based system, spending patterns using individual and aggregate consumer data, including tradeline data, internal customer data, and consumer panel data;

estimating, by the computer-based system, credit-related information of each consumer based on tradeline data of each consumer, previous balance transfers of each consumer, and the model of consumer spending patterns to arrive at estimated credit-related information, wherein the credit-related information comprises a spend amount associated with the individual consumer; and offsetting, by the computer-based system, the previous balance transfers from the estimated credit-related information;

calculating, by the computer-based system, a share of wallet for each consumer;

determining, by the computer-based system, a subset of the plurality of consumers whose share of wallet is above a given percentage of their size of wallet;

determining, by the computer-based system, an industry size of wallet for each consumer in the subset using a fixed weighting factor and a graded weighting factor in conjunction with lifestyle variables comprising a location rank, a length of each consumer's tenure with a credit bureau, each consumer's gender, and each consumer's household size, wherein the graded weighting factor varies, in accordance with the value of at least one of the lifestyle variables; and deriving, by the computer-based system, a correlation between an industry size of wallet of a given consumer and one or more characteristics of the given consumer using the industry size of wallet for the consumers in the subset.

2. The method of claim 1, wherein:

calculating a share of wallet comprises calculating a share of wallet associated with a given financial institution; and determining a subset of the plurality of consumers comprises identifying consumers whose share of wallet associated with the financial institution is greater than approximately 90%.

3. The method of claim 1, wherein determining an industry size of wallet comprises:

determining the amount of spend within the industry using one or more accounts associated with a financial institution; and equating the amount of spend within the industry with the industry size of wallet.

4. The method of claim 1, wherein the characteristics of the consumer include at least one of:

total size of wallet of the consumer;
residence location;
credit bureau tenure;
age;
gender;
household size; and
number of active transaction cards in a household of the consumer.

5. The method of claim 1, wherein deriving a correlation comprises:

identifying consumers having substantially similar industry sizes of wallet; and examining spend habits of the identified consumers to ascertain common characteristics that influence spend in the industry.

6. The method of claim 1, wherein the industry is one of a travel industry, a restaurant industry, or an everyday spend industry.

7. The method of claim 6, wherein the industry is an airline industry, a lodging industry, or a vehicle rental industry.

8. The method of claim 1, further comprising:
developing a model based on correlations between the industry size of wallet and the characteristics of the consumer.

9. The method of claim 8, wherein developing a model comprises:
assigning a weight to each of the characteristics.

10. The method of claim 9, wherein the characteristic is a residential location, and assigning a weight comprises:
computing an average industry size of wallet per zip code using a zip code and industry size of wallet for each consumer in the subset; and
assigning a weight for each zip code based on the average industry size of wallet per zip code.

11. A method of targeting consumers, comprising:
calculating, by a computer-based system for targeting consumers comprising a processor and a tangible, non-transitory memory, a total share of wallet associated with a financial institution for one or more consumers;
estimating, by the computer-based system, an industry size of wallet of each consumer, wherein the industry size of wallet of each consumer is calculated by a method comprising:
modeling, by the computer-based system, spending patterns using individual and aggregate consumer data, including tradeline data, internal customer data, and consumer panel data;
estimating, by the computer-based system, credit-related information of each consumer based on tradeline data of each consumer, previous balance transfers of each consumer, and the model of consumer spending patterns to arrive at estimated credit-related information, wherein the credit-related information comprises a spend amount associated with the individual consumer; and
offsetting, by the computer-based system, the previous balance transfers from the estimated credit-related information;
calculating, by the computer-based system, an external size of the industry size of wallet of each consumer using a fixed weighting factor and a graded weighting factor in conjunction with lifestyle variables comprising a location rank, a length of each consumer's tenure with a credit bureau, each consumer's gender, and each consumer's household size, wherein the graded weighting factor varies in accordance with the value of at least one of the lifestyle variables; and
targeting, by the computer-based system, one or more consumers having a relatively high external size of the industry size of wallet and a given minimal total share of wallet with offers to increase their industry share of wallet associated with the financial institution.

12. The method of claim 11, wherein estimating an industry size of wallet of each consumer comprises:
calculating an industry size of wallet using characteristics of the consumer that are indicative of industry spend.

13. The method of claim 12, wherein calculating an industry size of wallet of each consumer comprises:
assigning a weight to each characteristic of the consumer based on an industry size of wallet model; and
totaling the weighted characteristics for the consumer to produce an industry size of wallet for the consumer.

14. The method of claim 11, wherein calculating an external size of the industry size of wallet of the consumer comprises:
subtracting industry spend of the consumer associated with the financial institution from the industry size of wallet of the consumer.

15. The method of claim 14, wherein calculating an external size of the industry size of wallet of the consumer further comprises:
determining the amount of industry spend of the consumer associated with the financial institution from internal records of the financial institution.

16. The method of claim 11, wherein targeting one or more consumers comprises:
targeting the consumer with an offer for a new product to encourage new spending with the financial institution.

17. The method of claim 11, wherein targeting one or more consumers comprises:
targeting the consumer with an incentive to increase spending on an existing product associated with the consumer with the financial institution.

18. A computer readable storage medium bearing instructions, the instructions, when executed by a processor for modeling consumer spend by industry, cause said processor to perform operations comprising:
calculating, by the processor, a size of wallet for each consumer in a plurality of consumers, wherein the size of wallet is calculated by a method comprising:
modeling, by the processor, spending patterns using individual and aggregate consumer data, including tradeline data, internal customer data, and consumer panel data;
estimating, by the processor, credit-related information of each consumer based on tradeline data of each consumer, previous balance transfers of each consumer, and the model of consumer spending patterns to arrive at estimated credit-related information, wherein the credit-related information comprises a spend amount associated with the individual consumer;
offsetting, by the processor, the previous balance transfers from the estimated credit-related information;
calculating, by the processor, a share of wallet for each consumer;
determining, by the processor, a subset of the plurality of consumers whose share of wallet is above a given percentage of their size of wallet;
determining, by the processor, an industry size of wallet for each consumer in the subset using a fixed weighting factor and a graded weighting factor in conjunction with lifestyle variables comprising a location rank, a length of each consumer's tenure with a credit bureau, each consumer's gender, and each consumer's household size, wherein the graded weighting factor varies in accordance with the value of at least one of the lifestyle variables; and
deriving, by the processor, a correlation between an industry size of wallet of a given consumer and one or more characteristics of the given consumer using the industry size of wallet for the consumers in the subset.

* * * * *